(12) United States Patent
Strothmann

(10) Patent No.: US 8,367,955 B2
(45) Date of Patent: Feb. 5, 2013

(54) ILLUMINATED WALL SWITCH

(76) Inventor: Thomas Strothmann, Tucson, AZ (US)

( * ) Notice: Subject to any disclaimer, the term of this patent is extended or adjusted under 35 U.S.C. 154(b) by 277 days.

(21) Appl. No.: 12/777,438

(22) Filed: May 11, 2010

(65) Prior Publication Data

US 2010/0288609 A1    Nov. 18, 2010

Related U.S. Application Data

(60) Provisional application No. 61/216,039, filed on May 13, 2009.

(51) Int. Cl.
*H01H 9/16* (2006.01)
(52) U.S. Cl. .......................................... 200/315
(58) Field of Classification Search ............... 200/315, 200/317, 401
See application file for complete search history.

(56) References Cited

U.S. PATENT DOCUMENTS

| | | | | |
|---|---|---|---|---|
| 1,985,276 | A | * 12/1934 | Brach | 200/315 |
| 2,134,696 | A | * 11/1938 | Bigman | 200/315 |
| 4,013,857 | A | * 3/1977 | Tanaka | 200/315 |
| 4,291,211 | A | * 9/1981 | Discenza | 200/311 |
| 4,667,073 | A | 5/1987 | Osika | |
| 4,758,724 | A | * 7/1988 | Osika | 200/315 |
| 5,107,082 | A | 4/1992 | Valenzona | |
| 5,660,270 | A | * 8/1997 | Martin et al. | 200/315 |
| 5,752,595 | A | * 5/1998 | Fein et al. | 200/315 |
| 6,388,220 | B1 | * 5/2002 | Sasaki et al. | 200/537 |
| 6,713,697 | B2 | 3/2004 | Liu et al. | |
| 6,794,592 | B1 | 9/2004 | Liu et al. | |
| 6,805,469 | B1 | * 10/2004 | Barton | 362/365 |
| 6,940,029 | B1 | 9/2005 | Wang et al. | |
| 6,962,505 | B1 | 11/2005 | Savicki, Jr. et al. | |
| 7,036,948 | B1 | 5/2006 | Wyatt | |
| 7,213,932 | B1 | 5/2007 | Savicki, Jr. | |
| 7,399,936 | B2 | 7/2008 | Hurrle | |
| 7,837,344 | B2 | * 11/2010 | Altonen et al. | 362/85 |

* cited by examiner

*Primary Examiner* — Vanessa Girardi
(74) *Attorney, Agent, or Firm* — Richards Patent Law P.C.

(57) ABSTRACT

An electrical switch includes a housing and at least two electrical terminals. A pivoting toggle is provided within the housing for controlling the electrical connection between the two terminals. A light source is mounted to the housing in a fixed position and a length of optically conductive material extends from within the toggle to adjacent the light source, such that, when the light source is on, light is visible through the toggle via the optically conductive material.

19 Claims, 2 Drawing Sheets

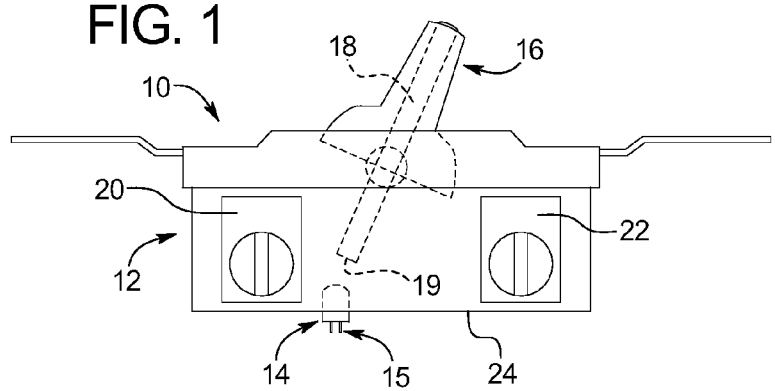
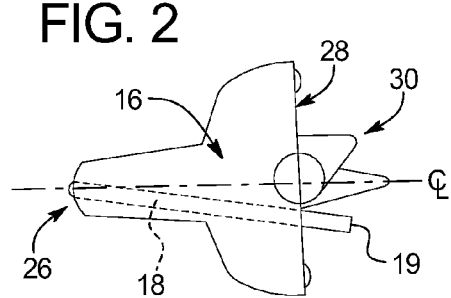
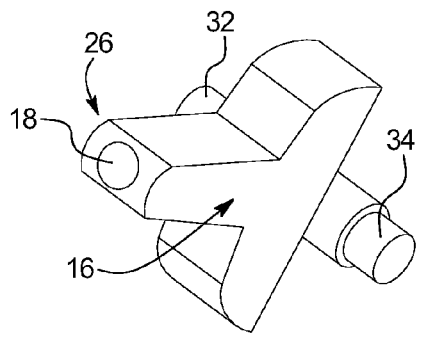
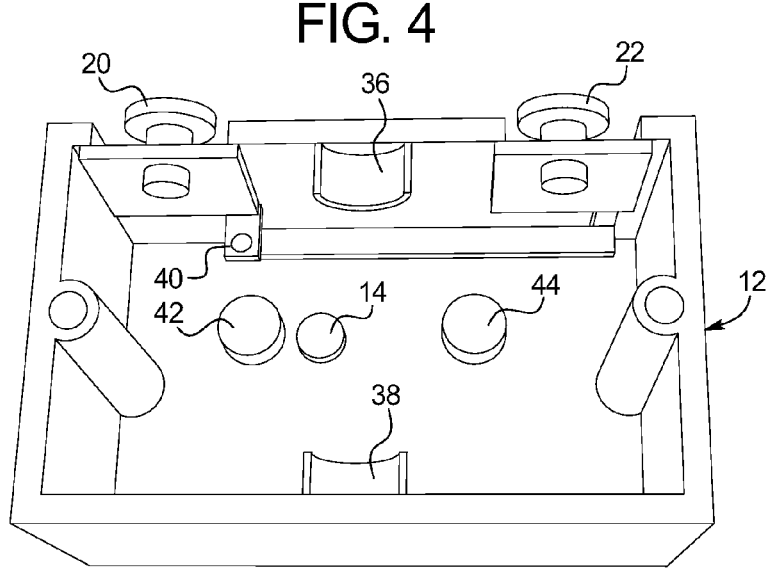

ILLUMINATED WALL SWITCH

CROSS-REFERENCE TO RELATED APPLICATIONS

This application incorporates by reference and claims priority to U.S. Provisional Patent Application No. 61/216,039 filed May 13, 2009.

BACKGROUND OF THE INVENTION

The present invention relates generally to electrical switches, and more particularly, to self illuminated electrical switches having internal lighting circuits.

Selectively operable electrical switches have long been utilized for actuating electrical devices. In the past, these switches have sometimes been provided with internal lighting circuits which illuminate the switch or portions thereof to achieve certain purposes. For example, such lighting circuits have been used to provide general illumination of a switch to facilitate use in an otherwise dark environment. Lighting circuits have also been employed to provide a visual indication that the switch illuminated by the circuit is currently being supplied with power. In addition, lighting circuits have also been constructed to indicate the operating state or operating position of the switch itself. For example, switches have been designed to include a lamp which only illuminates when the switch is in the "on" state (i.e., flowing current to a connected device) to enable a user to readily determine whether that switch has been thrown.

Self-illuminated or lighted switches typically suffer from certain disadvantages. For example, lighting circuits have commonly employed a light source in the interior of the toggle that is connected to electrical power through specially designed metal contacts that rotate or slide, thereby maintaining electrical contact while enabling movement of the toggle. These switch designs require multiple components, complex assembly and greater expense than switches that are not illuminated.

Accordingly, a need exists for a self-illuminated electrical wall switch that reduces the number of components, simplifies the assembly process, and thereby reduces the cost of manufacturing illuminated switches.

BRIEF SUMMARY OF THE INVENTION

The subject matter disclosed herein addresses these issues by providing a self-illuminated electrical wall switch that reduces the number of components, simplifies the assembly process, and thereby reduces the cost of manufacturing illuminated switches.

In one example, an electrical switch includes a housing and at least two electrical terminals. A pivoting toggle is provided within the housing for controlling the electrical connection between the two terminals. A light source is mounted to the housing in a fixed position and a length of optically conductive material extends from within the toggle to adjacent the light source, such that, when the light source is on, light is visible through the toggle via the optically conductive material.

The present subject matter has several apparent advantages when compared to designs using gas discharge lamps within a transparent toggle component that are connected to power through the use of moving electrical contacts. For example, the moving electrical contact design requires a complex assembly and additional metal contacts to provide power through the pivot point of the toggle. Further, the gas discharge light source is only visible in a dimly lit room and requires more power than a high efficiency LED light source. In addition, the gas discharge light source is visible only in a translucent or clear toggle material and cannot be adapted to brown or otherwise opaque switch toggles. Moreover, the glowing toggle of the gas discharge lamp design does not lend itself to communication of information to the user, such as blinking controlled by an external circuit. The glowing toggle of the gas discharge lamp design is not available in a variety of colors, whereas embodiments of the present subject matter incorporating an LED light source are available in numerous colors (including, for example, red, green, yellow, blue, pink, white, and others) and the various colors used in a group of switches can provide easy identification of a specific switch to a user, or can be coordinated with the color scheme of a room.

Since the illumination of the switch is in the toggle tip and the form factor of the switch is the same as standard wall switch designs, this improved design can be used in new construction without modification of construction design as well as a replacement switch or upgrade switch for use in existing buildings. By the nature of the design, no modification of the existing switch box or face plate is required to enable the toggle tip illumination.

The toggle tip illumination can also be driven by an external circuit that is under the control of the illuminated switch or independent of the control of the illuminated switch. As an example of this use of illumination, the toggle tip can be easily lit by an auxiliary emergency power source and indicate the location of a switch in the case of a general electrical failure. The LED source cited in this disclosure can easily interface with other low voltage electronic circuits.

The independent LED illumination can be configured to be visible when the switch is in either the up or down position and can provide a user interface with an external circuit such as an electronic timer where a flashing LED indicates the timer is running, a steady lit LED indicates the timer is bypassed, and a LED that is extinguished without movement of the switch indicates the timer has completed its countdown cycle.

It is an object of the present invention to provide an improved self-illuminated wall switch having an internal light source which does not move or interfere with the moving components of the switch. The light from such light source is conducted to the exterior surface of the switch through the use of optical fiber or similar material. This optical material allows placement of the light source at great distance from the exterior of the switch with little loss of intensity observed by the user while allowing the switch to maintain a standard form factor.

It is a further object to provide a self-illuminated switch of the foregoing type that can be manufactured with reduced cost both simply and efficiently.

It is another object of the invention to provide an improved self-illuminated switch that reduces energy usage through the use of high efficiency low current light sources with light output easily visible light to the user.

It is another object of the invention to provide a self-illuminated switch that is similar in form to existing non-illuminated switches and can be installed in pre-existing enclosures with no modification to the enclosure or switch plate cover.

It is another object of the invention to provide an illuminated switch wherein the light intensity visible to the user is independent of the opacity of the toggle material of construction.

It is another object of the invention to allow the illumination of the switch to be visible in high ambient light conditions and provide information to the user from an external circuit by being steadily lit, blinking, or turning off.

It is another object of the invention to design a self-illuminated switch that is novel in design and has aesthetic appeal to the user.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 1 is a simplified cross-section view of key components of a lighted switch constructed in accordance with the teachings of this invention.

FIG. 2 is a detailed cross-section of the toggle component of the lighted switch of FIG. 1.

FIG. 3 is a perspective view of the lighted switch toggle of FIG. 1 wherein a fiber optic material can be observed in the tip of the switch toggle.

FIG. 4 is a simplified perspective view of the interior of the switch housing of FIG. 1, showing key internal components and the placement of the light source within the switch housing.

FIG. 7 is a schematic diagram depicting how a low voltage LED light source used for illumination can be connected to 120VAC within the switch body and with an additional external connection, to light when the switch is on.

DETAILED DESCRIPTION OF THE INVENTION

Figure 5:
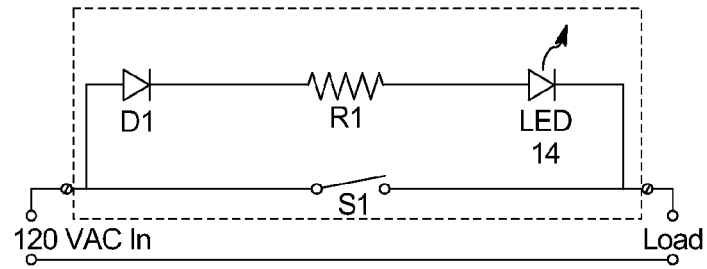
FIG. 5 is a schematic diagram depicting how a low voltage LED light source used for illumination can be connected to 120VAC within the switch body to light when the switch is off.

FIG. 1 illustrates electrical switch 10. As shown in FIG. 1, the electrical switch 10 is a self-illuminated wall switch including a housing 12, a light source 14, a toggle 16, an optical conductor 18 and a pair of terminals 20 and 22. As shown in FIG. 1, the electrical switch 10 and the housing 12 are based on the standard form factor electrical wall switch commonly used in commercial and residential installations. However, it is understood that elements of the subject matter provided herein may be incorporated into other form factors without departing from the scope of the invention. For example, while the housing 12 shown in FIG. 1 is constructed using the standard size, shape and materials of conventional electrical wall switches, the electrical switch 10 disclosed herein may be provided in any number of configurations.

The electrical switch 10 shown in FIG. 1 is adapted to provide a self-illuminated electrical switch 10, in which a fixed position light source 14 is provided to illuminate a toggle 16 or to be seen through the toggle 16. The light source 14 shown in FIG. 1 is a light emitting diode (LED) mounted to the rear wall 24 of the housing 12. By mounting the light source 14 in a fixed position, the electrical switch 10 avoids having to make use of moving electrical contacts (e.g., rotating, sliding, etc.) to connect with a power source to provide power to the light source 14. While shown in FIG. 1 as being mounted to the rear wall 24 of the housing 12, it is contemplated that the light source 14 may be provided anywhere along the interior or exterior of the housing 12 as long as the optical conductor 18 is provided to direct the light to be visible at the front of the housing 12. In addition, while shown as a common 5 mm low voltage LED, the light source 14 may be any number of light sources, including, for example, incandescent lamps, gas discharge lamps (e.g., fluorescent lamps, metal halide lamps, etc.), another type of LED (e.g., organic light emitting diode, high power LED, mid-range LED, miniature LED, etc.), etc.

The light source 14 shown in FIG. 1 has a pair of leads 15 (e.g., and anode and a cathode) that may be directly connected to a power source (not shown) to create a fixed electrical contact between the light source 14 and the power source.

The toggle 16 shown in FIG. 1 is pivotably supported within the housing 12. The toggle 16 shown pivots between a first and second position, to make and break electrical contact between the pair of terminals 20 and 22, thereby forming a pivoting switch. The toggle 16 shown is a standard form factor toggle 16 from an electrical wall switch. However, it is understood that any number of various designs of rockers, switches, etc. may be used as the toggle to provide the pivoting switch mechanism disclosed herein.

FIGS. 2 and 3 further illustrate the toggle 16 shown in FIG. 1. As shown in FIG. 2, the toggle 16 includes a tip 26, a base 28, a toggle cam 30 and pivoting supports 32 and 34. A length of the optical conductor 18 passes through the toggle 16 from the base 28 to the tip 26, such that light conducted by the optical conductor 18 may be seen through the toggle 16 at the front of the electrical switch 10. The optical conductor 18 may be embedded within the toggle 16 or otherwise incorporated into the toggle 16 to provide a path from the light source 14 to the tip 26 of the toggle 16. It is contemplated that in some examples of the electrical switch 10, the toggle 16 may be made, at least in part, from an optically conductive material, such as, clear polycarbonate or similar material. Moreover, in such embodiments, the toggle 16 may function as both the toggle 16 and the optical conductor 18 within a unitary element. For example, the toggle 16 shown in FIGS. 1 and 2 may further include a flexible tail extending from the base 28 formed from optically conductive material to replace the optical conductor 18 shown as a separate element in FIGS. 1 and 2. In other examples, the toggle 16 may be partially formed from optically conductive material. For example, the core of the toggle 16 may be formed from optically conductive material, such as fiber optic tubing, while the rest of toggle 16 may be essentially opaque. Further examples include a toggle 16 formed from optically conductive material and an opaque or semi-opaque coating is applied to limit the emission of light from the toggle 16.

Also, as shown in FIGS. 2 and 3, the optical conductor 18 extends all the way to the tip 26 of the toggle 16. It is understood that in other examples the optical conductor 18 may stop short of extending to or through the tip 26 and may instead terminate somewhere in or adjacent to the toggle 16.

FIG. 2 illustrates one example of how an optical conductor 18 may be positioned within a toggle 16. As shown in FIG. 2, the placement of the optical conductor 18 within the toggle 16 is skewed from the centerline CL of the toggle 16 so as to accommodate the toggle cam 30. In instances in which the electrical switch 10 is designed to illuminate when the electrical contacts are closed and the electrical switch 10 is in the "on" position, the optical conductor 18 may be positioned on the opposite side of the centerline CL as the toggle cam 30, as shown in FIG. 2. In instances in which the electrical switch 10 is designed to illuminate when the electrical contacts are open and the electrical switch 10 is in the "off" position, the optical conductor 18 may be positioned on the same side of the centerline CL as the toggle cam 30.

As shown and described with respect to FIGS. 1-3, the optical conductor 18 may be independent of the toggle 16 or may be integrally formed with the toggle 16. The optical conductor 18 may be formed from any optically conductive material, such as, for example, optical fiber. Using a flexible material such as an optical fiber may allow one end of the optical conductor 18 to be secured in place adjacent to or in close proximity with the light source 14 for embodiments in which the light source 14 is powered by an external power supply (not shown) and is lit or provides visual information regardless of the position of the toggle 16. In such cases, the position of the light source 14 may be moved such that the position of the toggle 16 does not interfere with the conducting of the light from the light source 14. For such embodiments, when the toggle 16 pivots within the housing 12, the fixed end of the optical conductor 18 remains in position to conduct the light emitted from the light source 14. It is contemplated that alternate embodiments of the optical conductor 18 may be implemented in which the optical conductor 18 is not flexible or is less flexible and the end of the optical conductor 18 that is adjacent or in close proximity to the light source 14 may not be fixed. However, appropriate accommodations to the configuration of the optical conductor 18 may be required, such as, for example, a larger base within which to receive the light, to account for the movement induced by the toggle 16.

The length of the optical conductor 18 shown in FIGS. 1 and 2 provides advantages over known existing switches. In the example shown in FIGS. 1 and 2, the optical conductor is approximately one inch long, allowing the distal tip 19 of the optical conductor to be placed adjacent to the light source 14, improving the conductance of the light to the tip 26. However, it is contemplated that the specific length of the optical conductor 18 may vary depending on the size and configuration of the electrical switch 10.

It is contemplated that using an external power source independent of the power source controlled by the electrical switch 10 to provide power to the light source 14 enables the electrical switch 10 to communicate information about the state of the electrical connection controlled by the electrical switch 10. For example, the light source 14 may blink to communicate information about the state of the electrical connection controlled by the electrical switch 10. Alternatively, the color or intensity of the light emitted by the light source 14 may vary to communicate different states.

FIG. 4 shows a simplified perspective view of key components internal to the housing 12. The toggle 16 is not shown in FIG. 4, but a pair of pivot cups 36 and 38 for supporting the pivoting supports 32 and 34 of the toggle 16 are shown. In use, the toggle cam 30 on the toggle 16 opens an electrical contact 40 when the switch is in the "off" position and closes the electrical contact 40 when the switch is in the "on" position.

As further shown in FIG. 4, the light source 14 is mounted in the rear face of the housing 12. The light source 14 is shown on the centerline of the housing 12 adjacent to one of a pair of toggle bumper pads 42 and 44. Locating the light source 14 near the bumper pad 42 enables the light source 14 to light the optical conductor 18 when the switch is in the "up" or "on" position in a typical wall switch. Locating the light source 14 near the bumper pad 44 enables the light source 14 to light the optical conductor 18 when the switch is in the "down" or "off" position in a typical wall switch.

Figure 6:
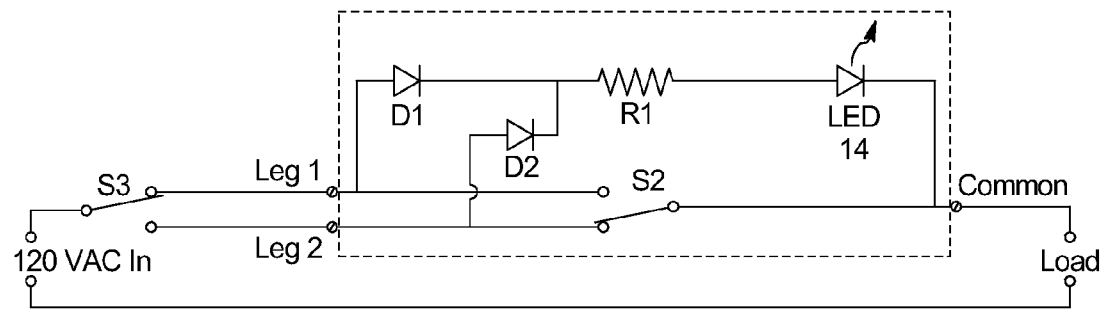
FIG. 6 is a schematic diagram depicting how a low voltage LED light source used for illumination can be connected to 120VAC within the switch body of a typical 3 way switch.
Figure 7:
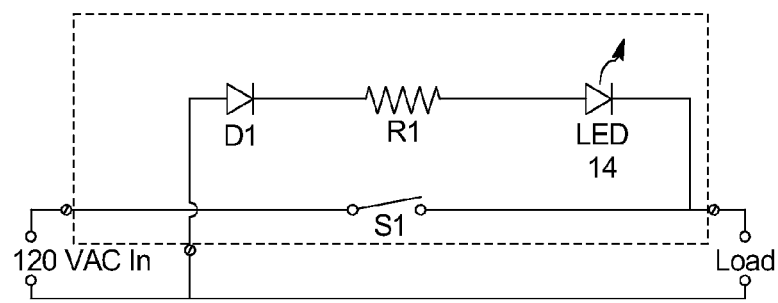

FIGS. 5-7 illustrate schematic representations of powering an LED as the light source 14 in various embodiments of the electrical switch 10. As described herein, power for the light source 14 can be provided from power applied to the electrical switch 10 or from an external source. However, in the examples shown in FIGS. 5-7, the power applied to the light source 14 is controlled by the electrical switch 12.

FIG. 5 shows a schematic diagram depicting how a low voltage LED light source 14 can be powered by a 120VAC power source through the use of a diode D1, a resistor R1, and an LED 14. In the example shown in FIG. 5, the diode D1 is an IN4003 or similar diode, the resistor R1 is a 220 K-ohm resistor and the LED 14 is an LED with an output intensity of approximately 2850 mcd. As further shown in FIG. 5, a switch S1 (i.e., the electrical contact 40) is provided within the housing 12. In the example shown in FIG. 5, when the switch S1 is open the LED 14 is lit as the circuit is completed by the load hooked to the switch S1. When the switch S1 is closed, the load is energized and the LED circuit is shorted and does not light. The intensity of the LED 14 can be adjusted by changing the value of R1 or selecting an LED 14 with different characteristics. The circuit depicted in FIG. 5 demonstrates a connection that will illuminate the electrical switch 10 when the load is turned off, thereby allowing the electrical switch 10 to be easily located in a dark room.

FIG. 6 shows a schematic diagram very similar in design and operation to that shown in FIG. 5 using the same component values for D1, R1, and the LED 14. However, while the circuit shown in FIG. 5 is common for typical two-way electrical switches 10, the circuit shown in FIG. 6 is a common configuration used for three-way electrical switches 10. In the circuit shown in FIG. 6, a second diode D2 (again, typically an IN4003 or similar) has been added to power the LED 14 whenever the load is turned off independent of the position of switches S2 and S3. The orientation of the first diode D1 and the second diode D2 enable the normal operation of the electrical switch 10 and prevent current from passing between a first leg 46 and a second leg 48. The circuit shown in FIG. 6 demonstrates connections that will illuminate the electrical switch 10 when the load is turned off, thereby allowing the electrical switch 10 to be easily located in a dark room.

FIG. 7 shows a schematic diagram very similar in design and operation to the one shown in FIG. 5 using the same component values for the diode D1, resistor R1 and the LED 14. However, the circuit configuration shown in FIG. 7 illuminates the electrical switch 10 to indicate to the user that the switch S1 is closed and the load has been turned on.

As can be seen from the previous figures and the description thereof, standard form factor wall switches can be easily converted to provide toggle tip illumination. All that is required to configure a standard switch for illumination is placement of an optical conductor 18 within the toggle 16, placement of a light source 14 in the housing 12 and the electrical connection of the light source 14 to a power source. From the foregoing it can be seen that an electrical switch 10 as described herein can be efficiently and cost effectively manufactured.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. An electrical switch comprising:
    a housing having an interior surface and an exterior surface;
    at least two terminals accessible along the exterior of the housing;
    a pivoting switch actuator pivotably supported within the housing, the pivoting switch actuator being pivotable between at least a first position and a second position, wherein the pivoting switch actuator effects an electrical connection between the two terminals in the first position, further wherein the pivoting switch actuator effects the disconnect of an electrical connection between the two terminals in the second position;
    a light source mounted in or on the housing in a fixed position, the light source having an off state and an on state; and
    a length of optically conductive material extending from within the pivoting switch actuator to a location within close proximity to the light source, such that, when the light source is in the on state, light is visible through the pivoting switch actuator via the optically conductive material, wherein the optically conductive material is optical fiber.

2. The electrical switch of claim 1 wherein the pivoting switch actuator is a rocker switch.

3. The electrical switch of claim 1 wherein the pivoting switch actuator is a toggle switch.

4. The electrical switch of claim 1 wherein the light source includes a light emitting diode.

5. The electrical switch of claim 1 wherein the light source is an incandescent lamp.

6. The electrical switch of claim 1 wherein the light source is a gas discharge lamp.

7. The electrical switch of claim 1 wherein the light source communicates information about the state of the electrical connection controlled by the switch.

8. The electrical switch of claim 1 wherein the pivoting switch actuator is constructed of an optically conductive material.

9. The electrical switch of claim 8 wherein a coating is applied to the pivoting switch actuator to limit the emission of light from the toggle.

10. The electrical switch of claim 1 further including a power supply electrically coupled to and powering the light source.

11. The electrical switch of claim 10 wherein the power supply is electrically coupled to the light source via fixed electrical contacts.

12. The electrical switch of claim 10 wherein the power supply is controlled by the position of the pivoting switch actuator.

13. The electrical switch of claim 10 wherein the power supply is not controlled by the position of the pivoting switch actuator.

14. An electrical switch comprising:
    a housing having an interior and exterior;
    a fixed position light source located within or on the housing;
    a power supply electrically coupled to the light source via fixed electrical contacts;
    a pivoting switch actuator that pivots between a first position and a second position, wherein in the first position the pivoting switch actuator engages an electrical connection within the housing and wherein in the second position the pivoting switch actuator disengages an electrical connection within the housing; and
    an optically conductive material having a first end and a second end, wherein the first end of the optically conductive material is located approximately adjacent the light source and wherein the second end is visible from the exterior of the housing through the pivoting switch actuator, wherein the optically conductive material is optical fiber.

15. The electrical switch of claim 14 wherein the second end of the optically conductive material is located within the pivoting switch actuator.

16. The electrical switch of claim 14 wherein the second end of the optically conductive material is exposed through an aperture in the pivoting switch actuator.

17. An electrical switch comprising:
    a housing including an interior, an exterior, a front, a back and one or more sides;
    a fixed position light source located within the interior or along the back or one or more sides of the housing;
    a pivoting switch controlling a power source, wherein the switch includes a tip exposed in front of the housing; and
    an optical conductor conducting light emitted from the fixed position light source through the switch tip to be visible from the front of the housing, wherein the optical conductor is optical fiber.

18. The electrical switch of claim 17 wherein the light source is a light emitting diode.

19. The electrical switch of claim 18 wherein the light emitting diode is powered by the power source.

* * * * *